(12) United States Patent
Dai

(10) Patent No.: US 8,831,250 B2
(45) Date of Patent: Sep. 9, 2014

(54) ELECTRONIC DEVICE AND TRANSMITTING METHODE THEREOF

(75) Inventor: Lung Dai, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 538 days.

(21) Appl. No.: 13/048,854

(22) Filed: Mar. 15, 2011

(65) Prior Publication Data

US 2012/0027233 A1  Feb. 2, 2012

(30) Foreign Application Priority Data

Aug. 2, 2010  (TW) .............................. 99125574 A

(51) Int. Cl.
*H02B 1/00* (2006.01)
*H04B 3/00* (2006.01)
*G01C 21/36* (2006.01)

(52) U.S. Cl.
CPC .................................. *G01C 21/3629* (2013.01)
USPC .................. 381/123; 381/80; 381/81; 700/94

(58) Field of Classification Search
CPC ........... G01C 21/3629; H03F 2200/03; H04H 60/04; H04H 20/83; H04R 5/04; H04R 2420/03; H04R 27/00; H04R 3/12; H04B 1/20; H04M 9/08; G11B 2020/10546; G11B 2020/10555; G11B 2020/10564; G11B 2020/10574; G11B 2020/10583; G11B 2020/10592; G11B 2020/10601; G06F 3/16
USPC .................... 381/123, 86, 56, 58, 77, 80–81; 340/500, 539.1, 539.13; 700/94
See application file for complete search history.

(56) References Cited

U.S. PATENT DOCUMENTS

| | | | |
|---|---|---|---|
| 2008/0219480 A1* | 9/2008 | Hopkins | 381/123 |
| 2010/0010648 A1* | 1/2010 | Bull et al. | 700/94 |
| 2010/0067722 A1* | 3/2010 | Bisgaard | 381/314 |
| 2011/0161006 A1* | 6/2011 | Deurwaarder | 701/207 |

* cited by examiner

*Primary Examiner* — Xu Mei
(74) *Attorney, Agent, or Firm* — Novak Druce Connolly Bove + Quigg LLP

(57) ABSTRACT

An electronic device comprises a first output module, a judgment module, a first switch module, a second output module, an operation module, a second switch module and a play module. The first output module generates a first audio signal. The second output module generates second audio signals. If the first audio signal is generated, the judgment module generates a first control signal. The first switch module switches to the first state and transmits the first audio signal. If the first audio signal is not generated, the judgment module generates a second control signal. The operation module generates a selecting signal. The second switch module switches to a second audio signal according to the selecting signal and transmits to the first switch module. The first switch module switches to the second state and transmits the selected second audio signal. The play module plays the audio signal.

13 Claims, 2 Drawing Sheets

ELECTRONIC DEVICE AND TRANSMITTING METHODE THEREOF

BACKGROUND

1. Technical Field

The present disclosure relates to an electronic device and particular to an electronic device used for playing audio signals.

2. Description of Related Art

A global positioning system (GPS) is a widely used in device in automobiles. A GPS is sometimes integrated with other electronic systems such as a radio and a DVD player, etc. When the radio or DVD player is on and the GPS is being used at the same time, a driver or passenger may have to switch from playing the radio to the GPS, and crucial information from the GPS may be missed.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
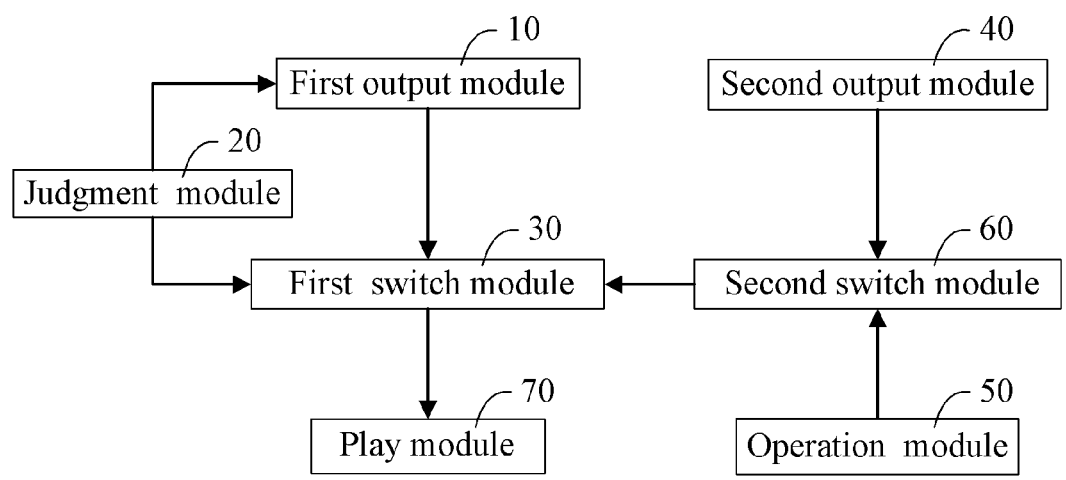
FIG. 1 is a block diagram of an electronic device in accordance with one embodiment.

Referring to FIG. 1, an electronic device 100 includes a first output module 10, a judgment module 20, a first switch module 30, a second output module 40, an operation module 50, a second switch module 60 and a play module 70. In the embodiment, the electronic device 100 may be a vehicle GPS navigation terminal with radio.

The first output module 10 is used for generating a first audio signal. In the embodiment, the first audio signal is a GPS audio signal.

The judgment module 20 is used for judging whether the first audio signal is generated and generating a control signal. If the first audio signal is generated, the judgment module 20 generates a first control signal to the first switch unit 30. If the first audio signal is not generated, the judgment module 20 generates a second control signal to the first switch unit 30.

The first switch module 30 is used for switching between a first state and a second state according to the control signal. If the first control signal is generated, the first switch module 30 switches to the first state. In the first state, the first switch module 30 transmits the first audio signal to the play module 70 directly. In the embodiment, the first switch module 30 is a multiplex switch such as a GSM3157 chip. The switching speed of the first switch module 30 is less than 20 ns per time.

The second output module 40 is used for generating second audio signals. In the embodiment, the second audio signals include at least two different channel radio audio signals.

The operation module 50 is used for generating a selecting signal by the operation of the user.

The second switch module 60 is used for selecting one of the second audio signals according to the selecting signal and transmitting the selected audio signal to the first switch module 30. The switching speed of the second switch module 60 is about 100 ms per time which is lower than the switching speed of the first switch module 30.

If the first control signal is not generated, the first switch module 30 switches to the second state. In the second state, the first switch module 30 transmits the selected second audio signal to the play module 70.

The play module 70 is used for playing the audio signal.

Figure 2:
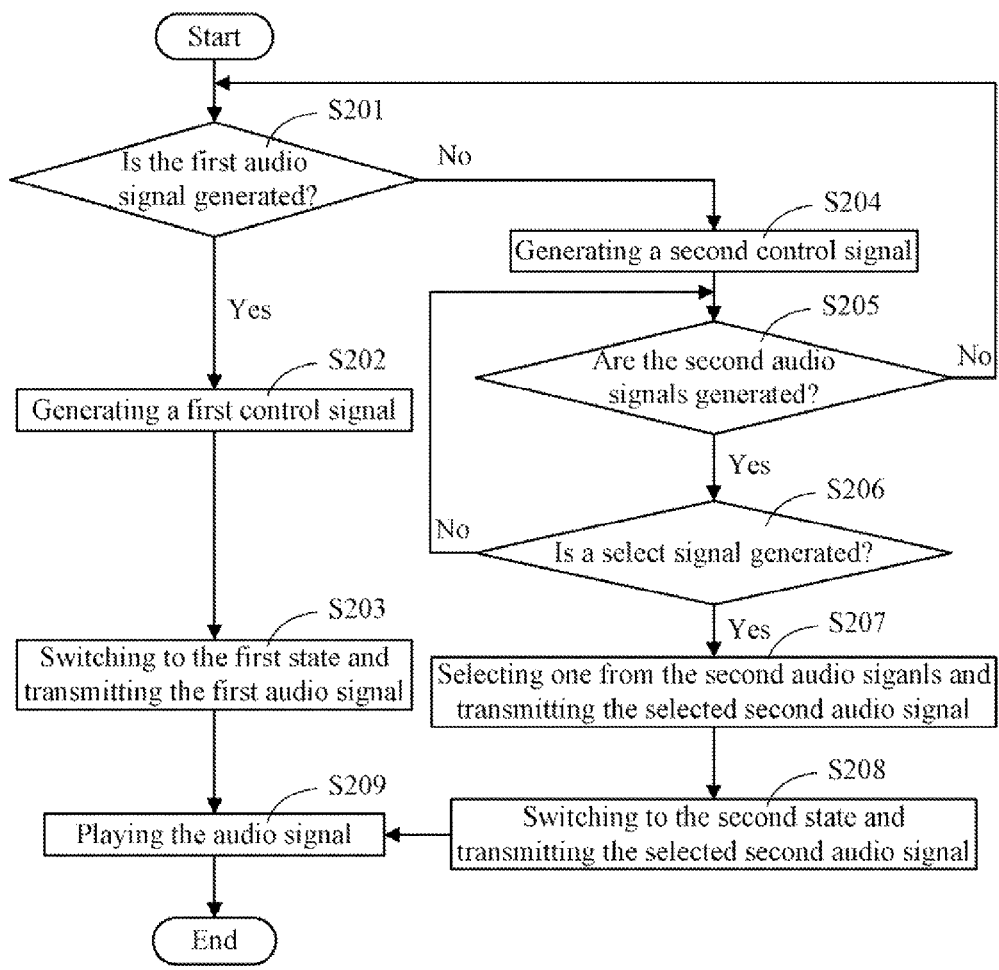
FIG. 2 is a flow chart of a transmitting method of the electronic device of FIG. 1 in accordance with the embodiment.

A transmitting method is used for transmitting the different audio signal of the electronic device in different ways. As shown in FIG. 2, the transmitting method includes the following steps.

In step S201, it is determined whether the first audio signal is generated. If the first audio signal is generated, the step S202 is implemented. If the first audio signal is not generated, the step S204 is implemented. In the embodiment, the first audio signal is a GPS audio signal.

In step S202, the judgment module generates a first control signal, the step S203 is implemented.

In step S203, the first switch module switches to the first state and transmits the first audio signal, the step S209 is implemented.

In step S204, the judgment module generates a second control signal.

In step S205, it is determined whether second audio signals are generated. If the second audio signals are generated, the step S206 is implemented. If the second audio signals are not generated, return to step S201. In the embodiment, the second audio signals include at least two different audio signals.

In step S206, it is determined whether a selecting signal is generated. If the selecting signal is generated, the step S207 is implemented. If the selecting signal is not generated, return to step S205.

In step S207, the second switch module selects one of the second audio signals and transmits the selected second audio signal.

In step S208, the first switch module switches to the second state and transmits the selected second audio signal, the step S209 is implemented.

In step S209, the play unit plays the audio signal and the process ends.

As described, when the GPS audio signal is generated, the second switch module 60 transmits the GPS audio signal to the play module 70 directly, such that missing an audio signal of the GPS is minimized.

It is to be understood, even though information and advantages of the present embodiments have been set fourth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device adapted to play audio signals, the electronic device comprising:

a first output module adapted to generate a first audio signal;

a second output module adapted to output second audio signals with different channel;

a play module adapted to play the first audio signal;

a judgment module adapted to determine whether the first audio signal is generated and generate a control signal, if the first audio signal is generated, the judgment module generates a first control signal;

a first switch module adapted to switch into a first state for transmitting the first audio signal to the play module according to the first control signal; and a second switch module adapted to select one of the second audio signals and transmit the select second audio signal to the first switch module;

wherein when the first audio signal is not generated, the judgment module generates a second control signal to control the first switch module to switch into a second state for transmitting the selected audio signals to the play module, and the play module further plays the selected second audio signal.

2. The electronic device of claim 1, wherein the first switch module includes a second state, if the first audio signal is not generated, the judgment module generates a second control signal, and the first switch module switches to the second state according to the second control signal.

3. The electronic device of claim 1, wherein the electronic device further comprises an operation module, the operation module is used for generating a selecting signal according to the operation by a user.

4. The electronic device of claim 1, wherein the switching speed of the first switch module is faster than the second switch module.

5. The electronic device of claim 1, wherein the first switch module is a GSM3157 chip.

6. The electronic device of claim 1, wherein the first audio signal is a global positioning system (GPS) audio signal.

7. A transmitting method is used for transmitting different audio signals of an electronic device, and the electronic device comprises a first switch module, a second switch module, and a play module, the transmitting method comprising:

determining whether a first audio signal is generated;

if the first audio signal is generated, generating a first control signal;

the first switch module switching into a first state according to the first control signal for transmitting the first audio signal;

the play unit playing the received audio signal;

if the first audio signal is not generated, generating a second control signal;

the first switch module switching into a second state according to the second control signal for transmitting the second audio signals;

determining whether second audio signals are generated;

when the second audio signals are generated, determining whether a selecting signal is generated;

if the selecting signal is generated, the second switch module selecting one of the second audio signals according to the selecting signal and transmitting the selected second audio signal to the first switch module; and the first switch module transmitting the selected second audio signal to the play module; and the play unit playing the received audio signal.

8. The method according to claim 7, wherein the first audio signal is a global positioning system (GPS) audio signal.

9. The method according to claim 7, wherein the first switch module is a GSM3157 chip.

10. The method according to claim 7, wherein the second audio signal comprises at least two different audio signals.

11. The method according to claim 7, wherein the switching speed of the first switch module is faster than the second switch module.

12. An electronic device adapted to play audio signals, the electronic device comprising:

a first output module adapted to generate a first audio signal;

a second output module adapted to output second audio signals with different channel which are different with the first audio signal;

a play module capable of playing the first audio signal and the second audio signals;

a first switch module connected between the first output module and the play module; and a second switch module connected between the second output module and the first switch module;

wherein a first path for transmitting audio signal is formed by the first output module, the first switch module, and the play module; a second path for transmitting audio signal is formed by the second output module, the second switch module, the first switch module, and the play module; the first path is established and the second path is cut off when the first output module generates the first audio signal; the first path is cut off and the second path is established when the first output module stops generating the first audio signal.

13. The electronic device according to claim 12, wherein the electronic device further comprises an operation module; when the second path is established, the operation module generates a selecting signal according to the operation by a user, and the second switch module selects one of the second audio signals according to the selecting signal.

* * * * *